Aug. 20, 1935.
R. TEATS
2,011,739
PROCESS FOR PRODUCING CADMIUM
Filed March 29, 1933
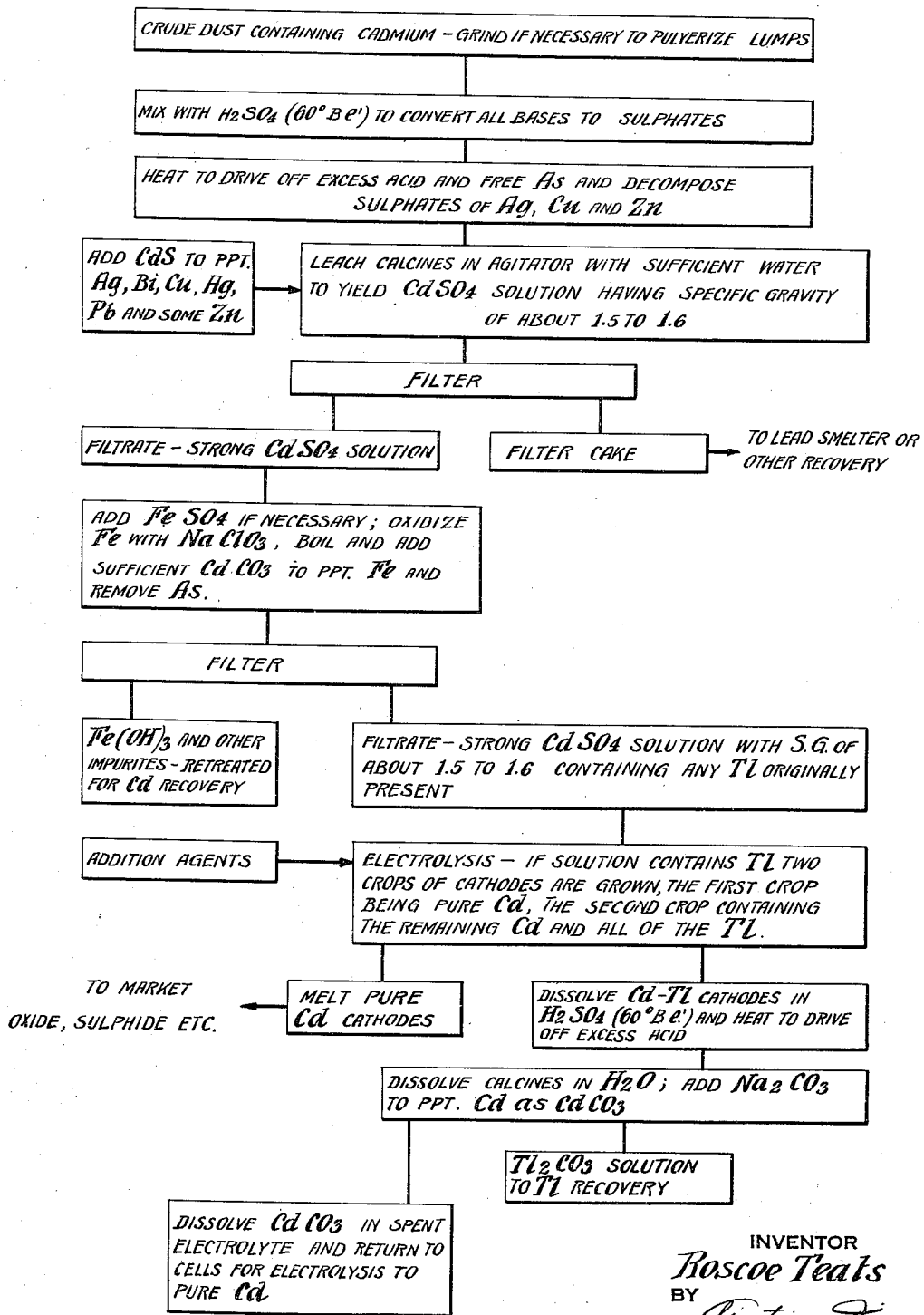
INVENTOR
Roscoe Teats
BY
ATTORNEYS Patented Aug. 20, 1935

2,011,739

UNITED STATES PATENT OFFICE 2,011,739

PROCESS FOR PRODUCING CADMIUM

Roscoe Teats, Denver, Colo., assignor to American Smelting and Refining Company, New York, N. Y., a corporation of New Jersey Application March 29, 1933, Serial No. 663,275

4 Claims. (Cl. 204—15)

This invention relates to the production of cadmium and particularly concerns an improved process for extracting and recovering cadmium from baghouse dusts, flue dusts, furnace products, ores and similar cadmium-bearing materials.

By the present invention, the crude material comprising the source of cadmium which has been brought to the desired physical condition is suitably treated to convert the cadmium and other bases to their corresponding sulphates. The sulphated mass is then subjected to an appropriate heat treatment and the resulting calcines thoroughly leached with water in quantities sufficient to yield a cadmium sulphate solution of desired concentration. Contaminating sulphates of other elements are precipitated from the solution as sulphides, preferably during the leaching process.

After effecting a separation between the insoluble and precipitated impurities and the cadmium sulphate solution, the latter is treated for the removal of arsenic as this element is generally present in sufficient quantities to necessitate its removal. This is accomplished by suitably oxidizing the iron ($FeSO_4$ may be added if the solution is deficient in this element), boiling the solution and precipitating the iron by adding cadmium carbonate to the hot solution. The arsenic accompanies the precipitated iron and with it is withdrawn from the solution.

The cadmium sulphate solution is then subjected to electrolysis in appropriate cells and the cadmium recovered at the cathodes as pure cadmium which may be melted and used as desired.

Thallium if present in the crude dust or other material treated will accompany the cadmium in sulphate solution throughout the process and, hence, will be present in the electrolyte. In such case the electrolysis is effected by growing two crops of cathodes, the first crop comprising pure cadmium and the second crop comprising the remaining cadmium and all of the thallium. Pure cadmium may be recovered from the cadmium-thallium cathodes by dissolving same in sulphuric acid, calcining the resulting sulphates, dissolving the calcined sulphates in water and precipitating the cadmium as cadmium carbonate by adding sodium carbonate to the solution. The cadmium carbonate may then be dissolved in spent electrolyte, returned to the electrolytic cells and recovered as pure cadmium at the cathodes.

The drawing accompanying and forming part of this specification is a flow sheet of a process for extracting and recovering cadmium in accordance with the invention.

Although the novel features which are believed to be characteristic of this invention will be particularly pointed out in the claims appended hereto, the invention itself, as to its objects and advantages, and manner in which it may be carried out, may be better understood by referring to the following description in which certain specific disclosures are made for purpose of explanation. It will be understood, however, that the processes and the steps thereof may be modified in various respects without departing from the broad aspects of the invention.

Specifically then, the invention may be practiced as follows: crude dust, containing, for example, 40% to 65% cadmium in an oxidized state and contaminated with various percentages of other elements, among which may be antimony, arsenic, bismuth, copper, iron, lead, mercury, selenium, tellurium, thallium and zinc, is ground to pulverize all lumps and the finely ground dust treated with sulphuric acid (60° Baumé) to convert the cadmium and other bases to their sulphates. The sulphated mass is then heated to drive off excess acid and free arsenic and to decompose the sulphates of copper, silver and zinc, which may be accomplished by heating the sulphated mass for approximately four hours in a furnace operated at a temperature of 600° C. to 800° C.

The calcined material may then be transferred to an agitator and leached with water in sufficient quantity to form a cadmium sulphate solution having a specific gravity of approximately 1.5 to 1.6. Impurities, such as bismuth, copper, mercury, lead, silver, zinc, etc., are precipitated from the cadmium sulphate solution by adding cadmium sulphide thereto, preferably during the agitating and leaching step. A two hour period of agitation usually suffices to thoroughly leach the calcines and precipitate dissolved impurities as sulphides from the cadmium sulphate solution.

A separation is then effected, as by filtration, of the insoluble and precipitated impurities from the strong cadmium sulphate solution. The former (filter cake) are sent to the lead smelter or are otherwise disposed of, while the cadmium sulphate solution (filtrate) is next treated for the removal of arsenic.

Arsenic is removed from the cadmium sulphate solution by adding sodium chlorate to the solution in order to oxidize the iron present, after which the solution is boiled and cadmium carbonate introduced into the hot solution thereby precipitating the iron as ferric hydroxide which carries the arsenic down with it. In case the iron content of the filtrate is insufficient to remove all of the arsenic, enough ferrous sulphate is introduced into the filtrate to make up the deficiency and insure complete precipitation of the arsenic. The precipitated iron and arsenic are removed by filtration and may be retreated for the recovery of cadmium contained therein, while the filtrate, comprising a strong cadmium sulphate solution with an appropriate specific gravity of 1.5 to 1.6, is appropriately subjected to electrolysis for the deposition of cadmium.

Electrolysis of the cadmium sulphate solution may be accomplished in appropriate electrolytic cells employing anodes of ferrosilicon and cadmium cathode starting sheets, the latter having been previously deposited upon and removed from aluminum cathodes. Addition agents, such as manganese dioxide (or other compounds capable of yielding manganese in solution) which prevents lead from depositing on the cathode and organic agents which insure smooth cathode deposits and which are capable of creating froth or foam on the surface of the electrolyte thus preventing the liberation of spray or mist to the atmosphere, are preferably added to the cadmium sulphate electrolyte.

As previously stated, thallium, if originally present in the crude dust treated, will accompany the cadmium through the purification process and will be present in the cadmium sulphate solution when the latter is ready for electrolysis. If such is the case, the electrolytic process is modified in that two crops of cathodes are grown. The first crop will be pure cadmium while the second crop will contain the remaining cadmium and all of the thallium. Pure cadmium is recovered from the cadmium-thallium cathodes by dissolving same in sulphuric acid (60° Baumé) and heating same to drive off excess acid. The calcines are then dissolved in water and cadmium precipitated as cadmium carbonate by adding sodium carbonate to the solution. The cadmium carbonate may then be dissolved in spent electrolyte and electrolyzed for the production of pure cadmium cathodes.

It will be appreciated that the present invention possesses many advantages in the recovery and extraction of cadmium from crude dust and other complex cadmium-bearing materials. For example, most of the cadmium may be obtained as pure cathode cadmium even though the electrolyte contains thallium without previous removal of that element. As a result, higher yields are obtained as considerable quantities of cadmium generally accompany the thallium when that element is removed prior to electrolysis.

Again, the use of cadmium carbonate as the precipitant in the arsenic removal step marks a distinct advance in that the concentration of cadmium in the sulphate solution is materially increased and clogging of apparatus is eliminated. In the process set forth in my prior U. S. Patent No. 1,869,213, dated July 26, 1932, ferric hydroxide is precipitated by lime in the arsenic removal step. In general, the cadmium solutions by that process assay approximately 225 grams of cadmium per liter with an average specific gravity of about 1.3 to 1.4. By employing cadmium carbonate, it is possible to obtain solutions assaying from 300 to 350 grams per liter with a specific gravity of approximately 1.5 to 1.6. Again, the use of lime necessitated frequent replacement of the pipe lines due to clogging thereof with calcium sulphate. The use of cadmium carbonate has rendered such replacement unnecessary.

While certain novel features of the invention have been disclosed and are pointed out in the annexed claims, it will be understood that various omissions, substitutions and changes may be made by those skilled in the art without departing from the spirit of the invention.

What is claimed is:

1. The method of recovering cadmium from a complex calcined sulphate mixture which comprises leaching same with water sufficient to yield a cadmium sulphate solution having a specific gravity of 1.5 to 1.6, adding cadmium sulphide during the leaching process to precipitate metallic impurities as sulphides, filtering the cadmium sulphate solution, eliminating arsenic from the filtrate by oxidizing the iron present and precipitating same with cadmium carbonate, filtering the cadmium sulphate solution and recovering cadmium therefrom by electrolysis.

2. Process for recovering cadmium from crude dust or similar material which comprises treating such materials with sulphuric acid to convert the bases including cadmium and thallium to sulphates, calcining said sulphates, agitating the calcines with water to obtain cadmium and thallium in sulphate solution, adding cadmium sulphide to precipitate impurities as sulphides, freeing said sulphate solution of arsenic by oxidizing iron contained therein and precipitating iron and arsenic therefrom by adding cadmium carbonate thereto, electrolyzing said sulphate solution to produce pure cadmium cathodes, removing same, continuing the electrolysis to produce cathodes of cadmium and thallium, dissolving the cadmium-thallium cathodes in sulphuric acid, calcining same, dissolving the calcines in water to form a sulphate solution of cadmium and thallium and recovering cadmium as cadmium carbonate from said cadmium sulphate-thallium sulphate solution by precipitation with sodium carbonate.

3. Process for recovering cadmium from crude dust or similar material which comprises treating such materials with sulphuric acid to convert the bases including cadmium and thallium to sulphates, calcining said sulphates, agitating the calcines with water to obtain cadmium and thallium in sulphate solution, adding cadmium sulphide to precipitate impurities as sulphides, freeing said sulphate solution of arsenic by oxidizing iron contained therein and precipitating iron and arsenic therefrom by adding cadmium carbonate thereto, electrolyzing said sulphate solution to produce pure cadmium cathodes, removing same, continuing the electrolysis to produce cathodes of cadmium and thallium, dissolving the cadmium-thallium cathodes in sulphuric acid, calcining same, dissolving the calcines in water to form a sulphate solution of cadmium and thallium, precipitating cadmium from the cadmium sulphate-thallium sulphate solution as cadmium carbonate, dissolving the precipitated cadmium carbonate in spent electrolyte and electrolyzing same thereby producing pure cadmium.

4. In a process for producing cadmium which comprises sulphating, calcining and leaching cadmium-bearing material to yield cadmium sulphate solution, precipitating impurities therefrom as sulphides, removing arsenic from said solution by oxidizing iron therein, boiling, and precipitating same from the hot solution, and recovering cadmium from the purified solution by electrolysis, the improvement which consists in utilizing cadmium carbonate as the precipitant in the arsenic removal step.

ROSCOE TEATS.